United States Patent
Soltani et al.

(10) Patent No.: US 8,840,821 B2
(45) Date of Patent: Sep. 23, 2014

(54) METHOD OF MANUFACTURING MOLDED ARTICLE INCLUDING COMPONENT INSERT-MOLDED IN RESIN MIXED WITH SOLID POWDER

(75) Inventors: Bahman Hossini Soltani, Anjo (JP); Hiroaki Mizuno, Kariya (JP); Motohiro Ishibashi, Anjo (JP); Osamu Nishikawa, Kariya (JP); Sadamu Shiotsuki, Nishio (JP); Kiyoshi Katoh, Anjo (JP)

(73) Assignee: Denso Corporation, Kariya (JP)

( * ) Notice: Subject to any disclaimer, the term of this patent is extended or adjusted under 35 U.S.C. 154(b) by 208 days.

(21) Appl. No.: 13/566,367

(22) Filed: Aug. 3, 2012

(65) Prior Publication Data
US 2013/0032964 A1 Feb. 7, 2013

(30) Foreign Application Priority Data
Aug. 3, 2011 (JP) ................. 2011-169806

(51) Int. Cl.
*B29C 39/10* (2006.01)
*B29C 39/02* (2006.01)

(52) U.S. Cl.
CPC ................. *B29C 39/02* (2013.01); *B29C 39/10* (2013.01)
USPC .......................... 264/69; 264/112; 264/272.19

(58) Field of Classification Search
None
See application file for complete search history.

(56) References Cited

U.S. PATENT DOCUMENTS 4,243,623 A * 1/1981 Sprengling et al. ............. 264/69
6,103,157 A * 8/2000 Behm et al. .................... 264/102

FOREIGN PATENT DOCUMENTS

| JP | 48-059364 | 8/1973 |
| JP | 2006-319188 | 11/2006 |
| JP | 2007-136805 | 6/2007 |
| JP | 2010-212632 | 9/2010 |

OTHER PUBLICATIONS

Office Action (2 pages) dated Jun. 4, 2013, issued in corresponding Japanese Application No. 2011-169806 and English translation (3pages).

* cited by examiner

*Primary Examiner* — Mary F Theisen
(74) *Attorney, Agent, or Firm* — Nixon & Vanderhye PC

(57) ABSTRACT

The exemplary embodiment provides a method of manufacturing a molded article including a component insert-molded in a molding material mixed with solid powder. The method includes an injecting step of injecting the molding material and the solid powder into a molding die, an agitating step of agitating the molding material and the solid powder within the molding die to disperse the solid powder in the molding material, and an embedding step of pressing and embedding the component into the agitated mixture of the molding material and the solid powder while vibrating at least one of the component and the molding die.

11 Claims, 5 Drawing Sheets

METHOD OF MANUFACTURING MOLDED ARTICLE INCLUDING COMPONENT INSERT-MOLDED IN RESIN MIXED WITH SOLID POWDER

This application claims priority to Japanese Patent Application No. 2011-169806 filed on Aug. 3, 2011, the entire contents of which are hereby incorporated by reference.

BACKGROUND OF THE INVENTION

1. Field of the Invention

The present invention relates to a method of manufacturing a molded article including a component insert-molded in a resin mixed with solid powder.

2. Description of Related Art

Japanese Patent Application Laid-open No. 2007-136805 describes a method of manufacturing such a molded article. In this method, a molded article is manufactured by agitating a casting material injected into a casting material cup, and injecting the agitated casting material into a casting die from the casting material cup. When the casting material is a molding material to be mixed with solid powder, the molding material and the solid powder mixed at a predetermined mixing ratio is injected into the casting material cup, and agitated so that the solid powder is dispersed in the molding material. Thereafter, the agitated mixture of the molding material and the solid powder is injected into the casting die from the casting material cup to mold a molded article.

However, the above method has a problem in that since the solid powder precipitates in the casting material cup, the mixing ratio of the solid powder deviates from die-to-die. Further, when the mixing ratio of the solid powder is high, since the viscosity of the agitated mixture of the molding material and the solid powder is high, it becomes difficult to inject the agitated mixture into the casting die from the casting material cup, causing the manufacturing time to be lengthened. In addition, when the viscosity is higher, since the agitated mixture adheres more to the surface of the casting material cup, an amount of the agitate mixture which resides in the casting material cup and not injected into the casting die increases, as a result of which the yield ratio decreases.

SUMMARY

An exemplary embodiment provides a method of manufacturing a molded article including a component insert-molded in a molding material mixed with solid powder including:

an injecting step of injecting the molding material and the solid powder into a molding die;

an agitating step of agitating the molding material and the solid powder within the molding die to disperse the solid powder in the molding material; and an embedding step of pressing and embedding the component into the agitated mixture of the molding material and the solid powder while vibrating at least one of the component and the molding die.

According to the exemplary embodiment, it is possible to manufacture molded articles including a component insert-molded in a molding material mixed with solid powder with low article-to-article variation in the mixing ratio of the solid powder at a high efficiency Other advantages and features of the invention will become apparent from the following description including the drawings and claims.

BRIEF DESCRIPTION OF THE DRAWINGS

In the accompanying drawings

PREFERRED EMBODIMENTS OF THE INVENTION

The present invention will be described by way of an embodiment for manufacturing reactors for use in a motor control apparatus which controls a vehicle-driving motor.

Figure 1:
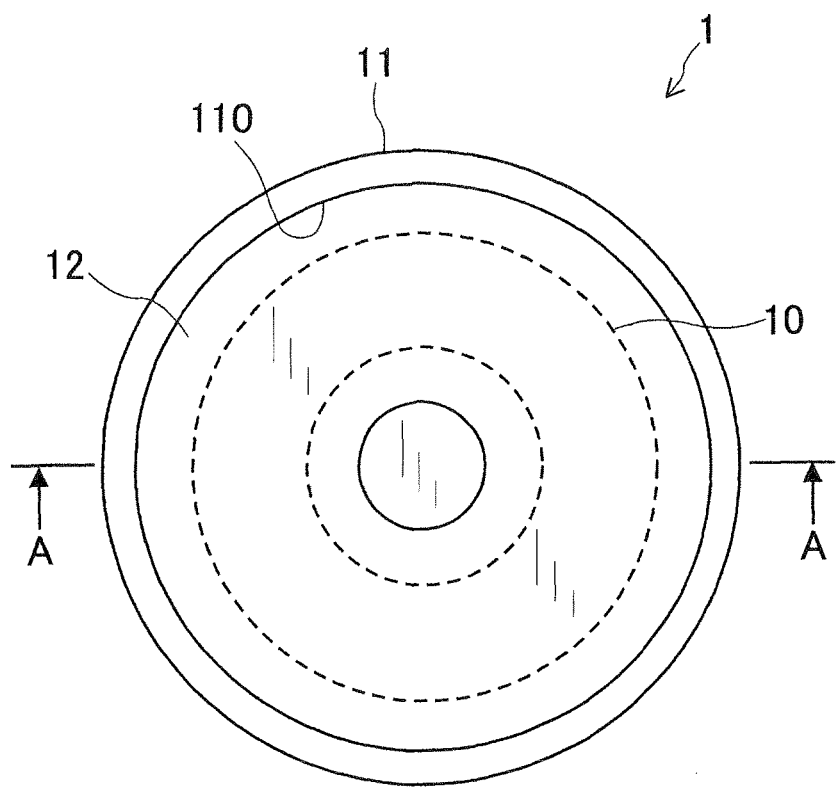
FIG. 1 is a top view of a reactor manufactured by a method according an embodiment of the invention.
Figure 2:
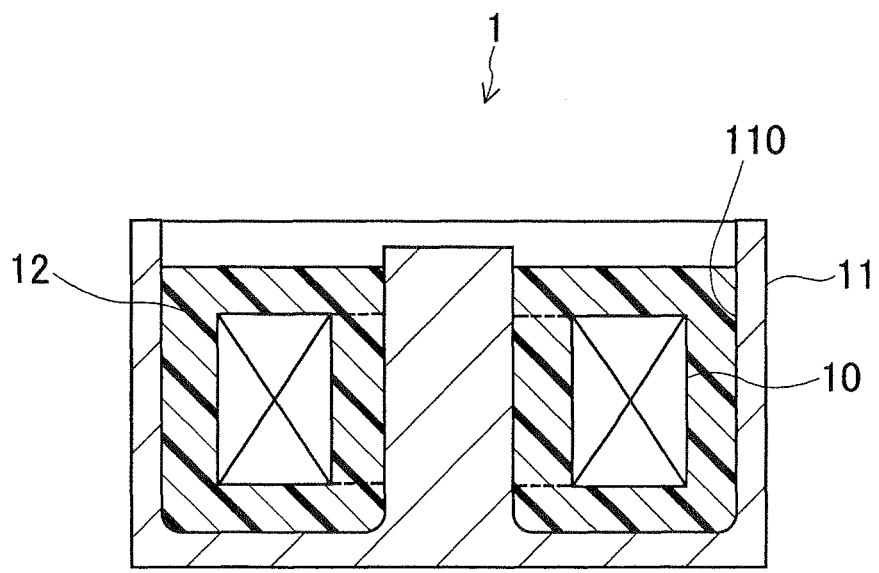
FIG. 2 is a cross-sectional view of FIG. 1 taken along line A-A.

First, the structure of a reactor 1 manufactured by the method according to the embodiment of the invention is explained with reference to FIGS. 1 and 2. FIG. 1 is a top view of the reactor 1. FIG. 2 is a cross-sectional view of FIG. 1 taken along line A-A. In FIGS. 1 and 2, terminals of a coil 10 of the reactor 1 are omitted from illustration.

The reactor 1 as a molded article is a device for use in a motor control apparatus mounted on a vehicle for controlling a vehicle-driving motor. The reactor 1 includes the coil 10 as a component, and a case 11.

The coil 10 is a circular-ring shaped component formed by winding a copper wire coated with insulating material on its surface. The case 11 is a columnar member made of aluminum for housing the coil 10. The case 11 is formed with a circular groove 110. The coil 10 is disposed inside the groove 110 to be molded inside a thermosetting resin 12 mixed with iron powder. The case 11 is fixed integrally to the coil 10 through the thermosetting resin 12.

Figure 3:
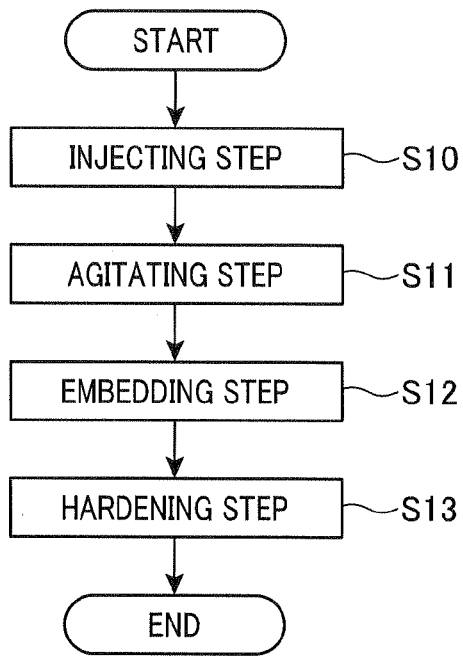
FIG. 3 is a flowchart showing steps included in the method according to the embodiment carried out for manufacturing the reactor.
Figure 4:
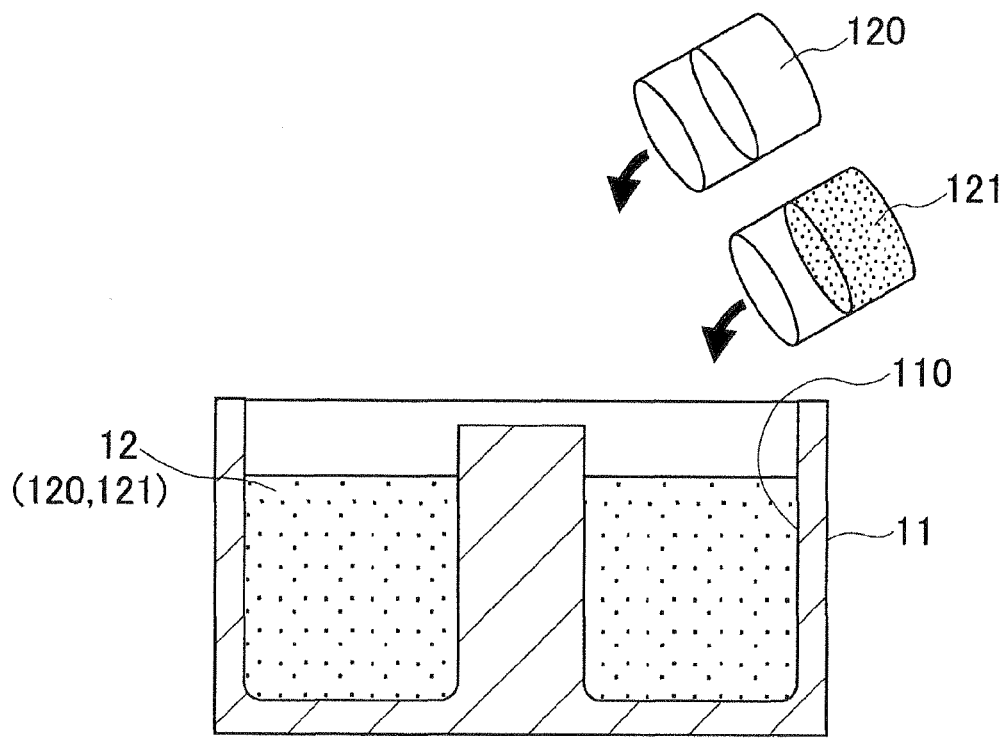
FIG. 4 is an explanatory view explaining an injecting step included in the method according the embodiment.
Figure 5:
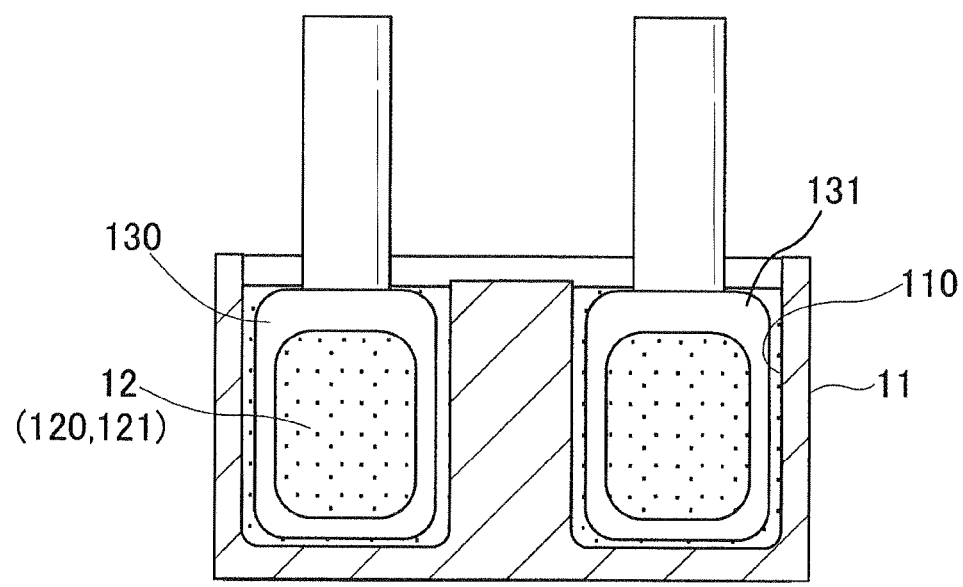
FIG. 5 is an explanatory view explaining an agitating step included in the method according the embodiment.
Figure 6:
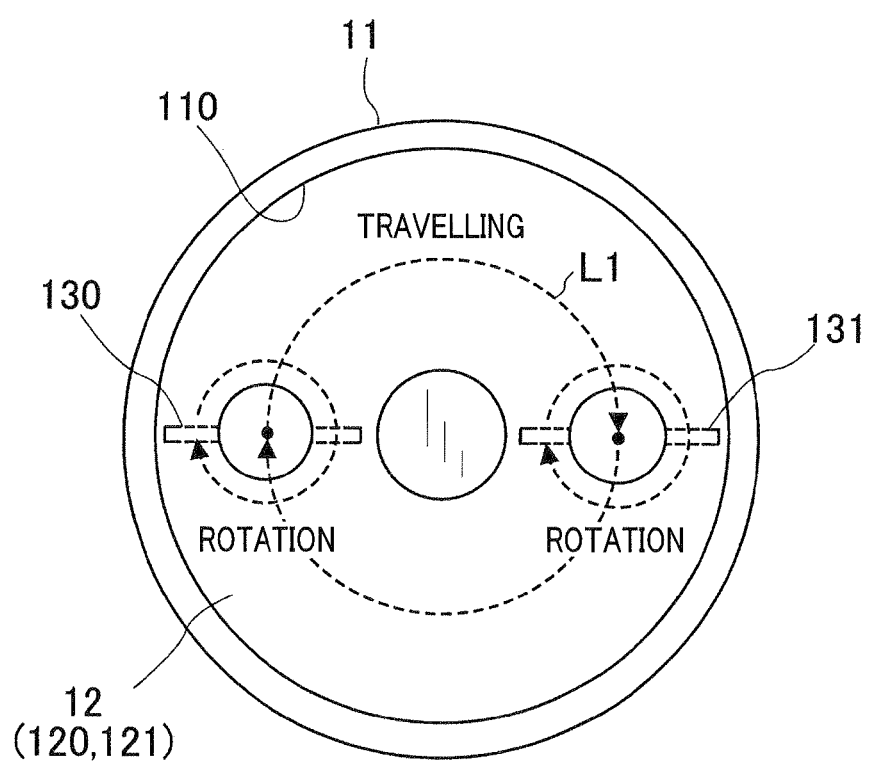
FIG. 6 is another explanatory view explaining the agitating step included in the method according the embodiment.
Figure 7:
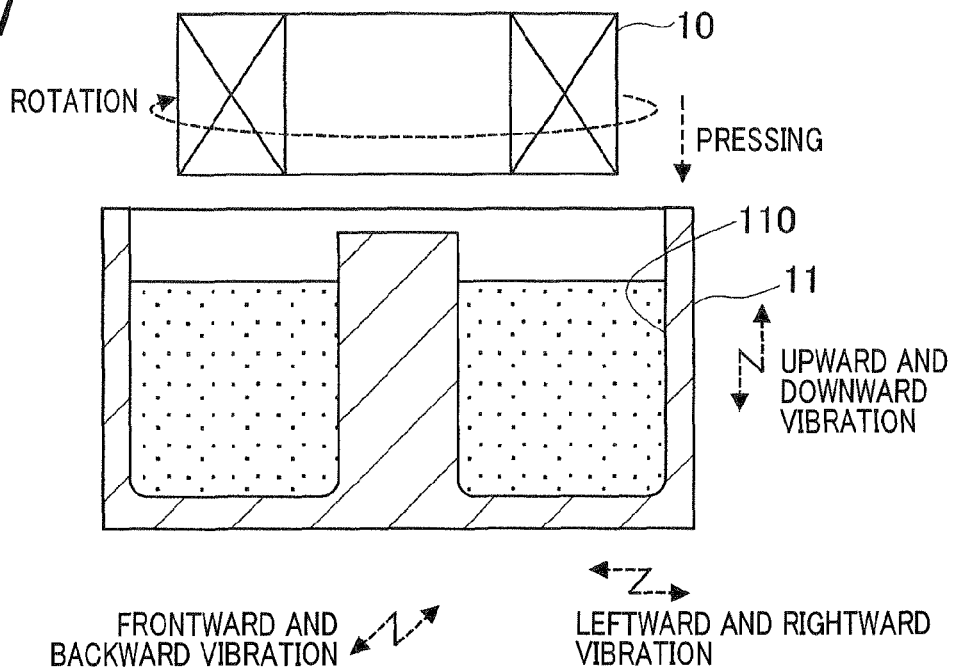
FIG. 7 is an explanatory view explaining an embedding step included in the method according the embodiment.
Figure 8:
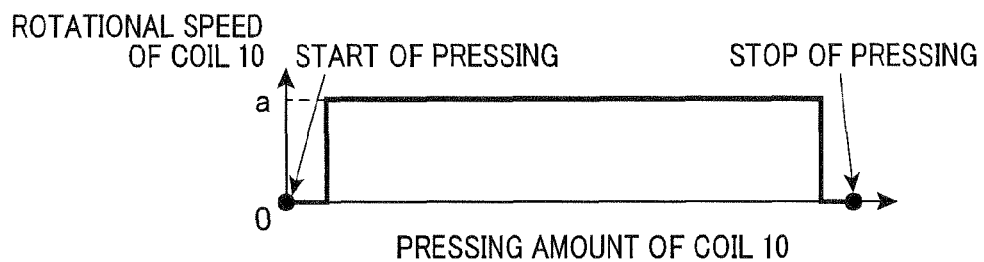
FIG. 8 is a graph showing a way to rotate a coil in an embedding step included in the method according the embodiment.
Figure 9:
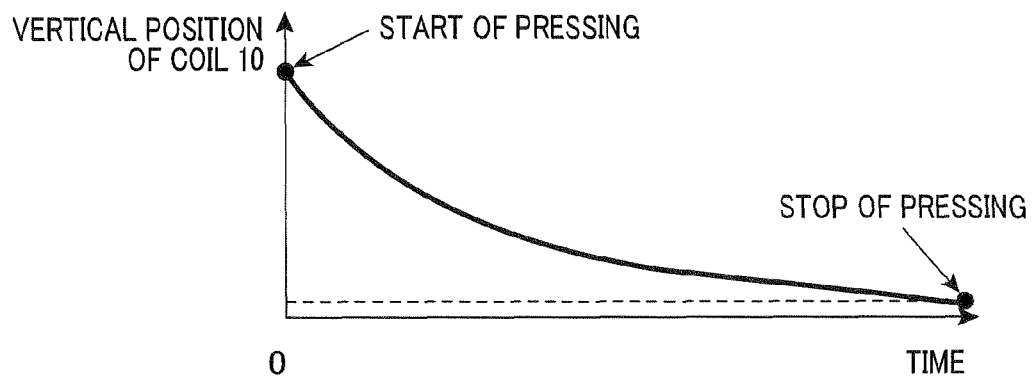
FIG. 9 is a graph showing a way to press the coil in the embedding step included in the method according the embodiment.
Figure 10:
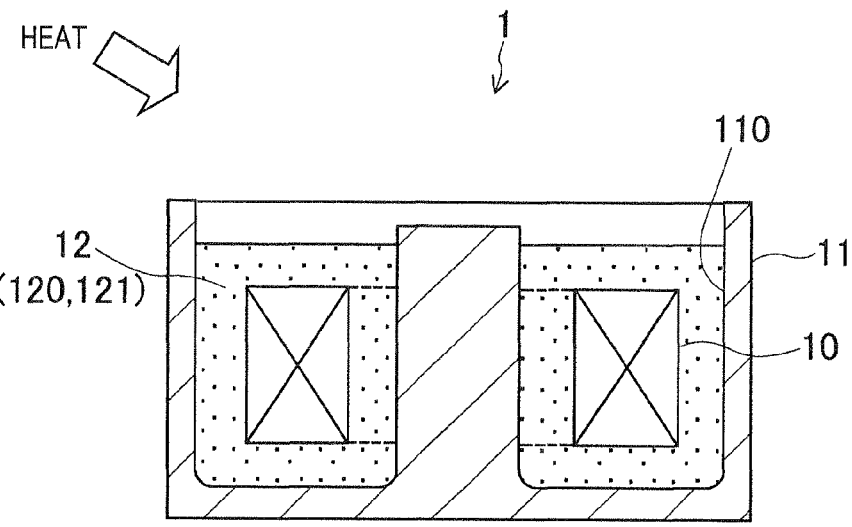
FIG. 10 is an explanatory view explaining a hardening step included in the method according the embodiment.

Next, a method of manufacturing the reactor 1 as an embodiment of the invention is explained with reference to FIGS. 3 to 10. FIG. 3 is a flowchart showing steps included in the method of manufacturing the reactor 1. FIG. 4 is an explanatory view explaining an injecting step included in the method according the embodiment. FIG. 5 is an explanatory view explaining an agitating step included in the method according the embodiment. FIG. 6 is another explanatory view explaining the agitating step included in the method according the embodiment. FIG. 7 is an explanatory view explaining an embedding step included in the method according the embodiment. FIG. 8 is a graph showing a way to rotate the coil 10 in the embedding step. FIG. 9 is a graph showing a way to press the coil 10 in the embedding step. FIG. 10 is an explanatory view explaining a hardening step included in the method according the embodiment. In FIGS. 4 to 7, terminals of the coil 10 of the reactor 1 are omitted from illustration.

As shown in the flowchart of FIG. 3, the method of manufacturing the reactor 1 is constituted of the injecting step S10, the agitating step S11, the embedding step S12 and the hardening step S13.

The injecting step S10 is a step for injecting a thermosetting resin 120 as a molding material and iron powder 121 as a solid magnetic powder into the case 11 which serves also as a molding die. More specifically, the thermosetting resin 120 and the iron powder 121 weighed to a predetermined mixing ratio are injected into the groove 110 as shown in FIG. 4.

The agitating step S11 is a step for agitating the thermosetting resin 120 and the iron powder 121 within the case 11 as a molding die so that the iron powder 121 is dispersed in the thermosetting resin 120 as a molding material. More specifically, as shown in FIGS. 5 and 6, two agitating blades 130 and 131 are disposed so as to be opposed to each other by 180 degrees inside the groove 110. As shown in FIG. 6, the agitating blades 130 and 131 are travelled along a circular path L1 while being rotated. By this agitating step, the iron powder 121 is dispersed in the thermosetting resin 120 within the case 11.

As shown in FIG. 7, the embedding step S12 is a step for pressing and embedding the coil 10 into the mixture of the thermosetting resin 120 and the iron powder 121 agitated within the case 11. More specifically, as shown in FIG. 8, the coil 10 being rotated in one direction at a constant speed is pressed while the case 11 is vibrated in the forward and backward direction, the leftward and rightward direction and the upward and downward direction. At this time, each of the torque to rotate the coil 10 and the pressure to press the coil 10 is adjusted within a range to prevent the insulating layer of the coil 10 from being broken. To this end, in this embodiment, the embedding amount of the coil 10 per unit time is decreased with time as shown in FIG. 9. That is, the speed of embedding the coil 10 is large initially, and decreased with time.

As shown in FIG. 10, the hardening step S13 is a step for applying heat to the agitated mixture which is embedded with the coil 10, so that the thermosetting resin 120 mixed with the iron powder 121 is hardened. With this step, the reactor 1 is completed.

The embodiment described above provides the following advantages.

In this embodiment, a necessary amount of each of the thermosetting resin 120 and the iron powder 121 is directly injected into the case 11. This makes it possible to suppress reactor-to-reactor variation of the mixing ratio of the iron powder 121 when the reactor 1 is mass-produced. This also makes it possible to reduce wasting the thermosetting resin 120 and the iron powder 121, to thereby improve the yield ratio. In this embodiment, the thermosetting resin 120 and the iron powder 121 injected into the case 11 are agitated inside this case 11. Accordingly, unlike conventional methods, it is not necessary to inject an agitated mixture of the thermosetting resin 120 and the iron powder 121 into the case 11. Accordingly, this embodiment makes it possible to shorten the manufacturing time. Hence, according to this embodiment, it is possible to mold the coil 10 with high efficiency while suppressing reactor-to-reactor variation of the mixing ratio of the iron powder 121 when the reactor 1 is mass-produced. Further, the thermosetting resin 120 and the iron powder 121 are vibrated by vibrating the case 11. The thermosetting resin 120 and the iron powder 121 can be liquefied by vibrating them. Accordingly, according to this embodiment, it is possible to press and embed the coil 10 into the agitated mixture of the thermosetting resin 120 and the iron powder 121 at a lower pressure.

In this embodiment, the coil 10 is pressed into the agitated mixture of thermosetting resin 120 and the iron powder 121, while being rotated in the embedding step S12. This makes it possible to press and embed the coil 10 into the agitated mixture of the thermosetting resin 120 and the iron powder 121 at a further lower pressure.

In this embodiment, the torque to rotate the coil 10 is adjusted so that the insulating layer of the coil 10 is not broken in the embedding step S12. This makes it possible to prevent the insulating layer of the coil 10 from being broken due to the torque used to rotate the coil 10.

In this embodiment, also the pressure to press the coil 10 is adjusted so that the insulating layer of the coil 10 is not broken in the embedding step S12. This makes it possible to prevent the insulating layer of the coil 10 from being broken due to the pressure used to press the coil 10.

In this embodiment, since the case 11 housing the coil 10 used also as a molding die, it is not necessary to prepare a molding die separately, and it is not also necessary to remove the molded coil 10 from the molding die. Accordingly, according to this embodiment, the working hours can be shortened.

In this embodiment, the coil 10 is insert-molded in the mixture of the thermosetting resin 120 and the iron powder 121 under the condition that the iron powder 121 is sufficiently dispersed in the thermosetting resin 120. Accordingly, according to this embodiment, it is possible to manufacture reactors with sufficiently small reactor-to-reactor variation in magnetic characteristics.

Figure 11:
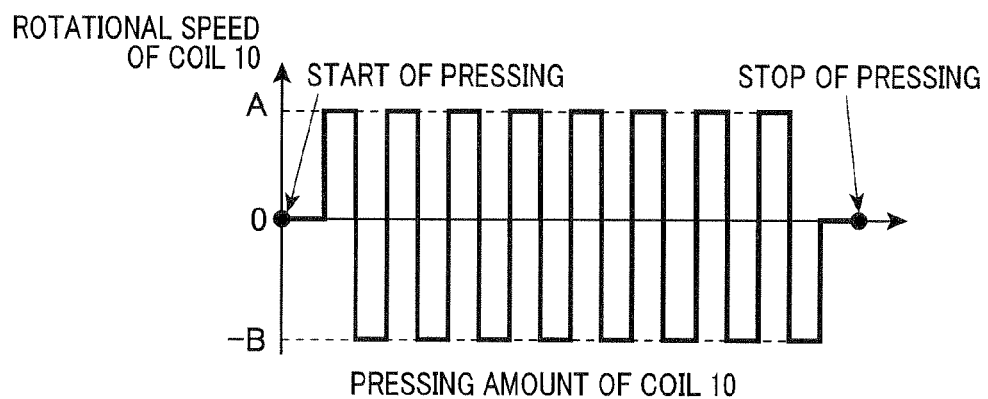
FIG. 11 is a graph showing another way to rotate the coil in the embedding step included in the method according the embodiment.
Figure 12:
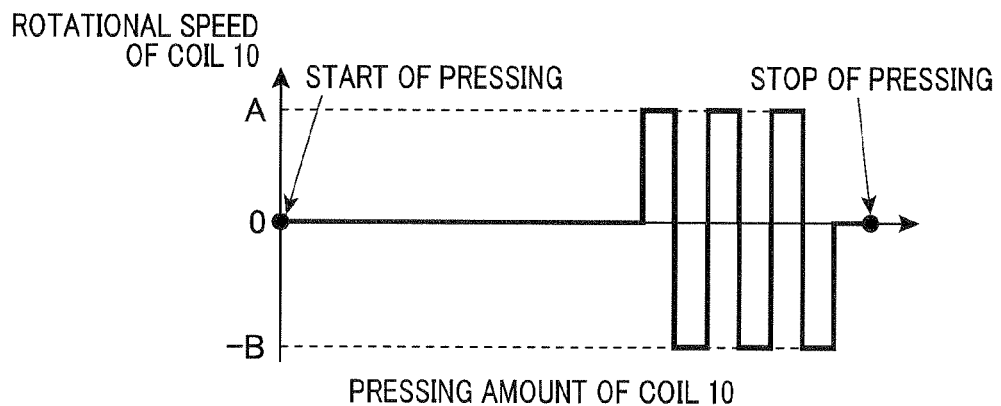
FIG. 12 is a graph showing still another way to rotate the coil in the embedding step included in the method according the embodiment.

In this embodiment, the coil 10 is pressed while being rotated in one direction in the embedding step S12. However, the coil 10 may be pressed while being rotated in the normal and reverse directions repeatedly in the embedding step S12. In this case, as shown in FIG. 11, the coil 10 may be switched between the normal rotation and the reverse rotation in accordance with the pressed amount of the coil 10 within the mixture of the thermosetting resin 120 and the iron powder 121. At this time, the speed of the reverse rotation may be set to −B which is different from the speed A of the normal rotation. Further, as shown in FIG. 12, the coil 10 may be pressed without being rotated until the coil 10 reaches a position beyond which the coil 10 becomes hard to be pressed into the mixture of the thermosetting resin 120 and the iron powder 121, and thereafter pressed while being rotated in the normal and reverse directions repeatedly.

In the above described embodiment, the coil 10 is insert-molded in the thermosetting resin 120 mixed with the iron powder 121. However, the thermosetting resin 120 may be mixed with magnetic powder other than iron powder. Further, the thermosetting resin 120 may be mixed with solid powder other than magnetic powder.

In the above described embodiment, the coil 10 is pressed in the state of being rotated while the case 11 is vibrated in the forward and backward direction, the rightward and leftward direction and the upward and downward direction in the embedding step S12. However, the coil 10 may be pressed in the state of being rotated while the case 11 is vibrated in at least one of the forward and backward direction, the rightward and leftward direction and the upward and downward direction in the embedding step S12. Also in this case, the mixture of the thermosetting resin 120 and the iron powder 121 can be liquefied by vibrating them, and the coil 10 can be pressed into the mixture at a lower pressure. Instead of vibrating the case 11, the coil 10 may be vibrated, or both the coil 10 and the case 11 may be vibrated.

In the above described embodiment, the case 11 has a columnar shape formed with the circular groove 110. However, the case 11 may be shaped into a bottomed cylinder. Further, the case 11 may not be formed with the columnar projection at its center.

The above explained preferred embodiments are exemplary of the invention of the present application which is described solely by the claims appended below. It should be understood that modifications of the preferred embodiments may be made as would occur to one of skill in the art.

What is claimed is:

1. A method of manufacturing a molded article including a component insert-molded in a molding material mixed with solid powder comprising:
    an injecting step of injecting the molding material and the solid powder into a molding die:
    an agitating step of agitating the molding material and the solid powder within the molding die to disperse the solid powder in the molding material; and
    an embedding step of pressing and embedding the component into the agitated mixture or the molding maternal and the solid powder while vibrating at least one of the component and the molding die,
    wherein the component is pressed and embedded into the agitated mixture of the molding material and the solid powder while being rotated in the embedding step.

2. The method of manufacturing a molded article according to claim 1, wherein torque to rotate the component is adjusted within a range which avoids the component from being broken during the embedding step.

3. A method of manufacturing a molded article including a component insert-molded in a molding material mixed with solid powder comprising:
    an injecting step of injecting the molding material and the solid powder into a molding die;
    an agitating step of agitating the molding material and the solid powder within the molding die to disperse the solid powder in the molding material; and
    an embedding step of pressing and embedding the component into the agitated mixture of the molding material and the soild power while vibrating at least one of the component and the molding die,
    wherein pressure to press the component is adjusted within a range which avoids the component from being broken during the embedding step.

4. The method of manufacturing a molded article according to claim 1, wherein the molding die is a case for housing the component.

5. The method of manufacturing a molded article according to claim 1, wherein the component is a reactor coil.

6. The method of manufacturing a molded article according to claim 5, wherein the solid powder is magnetic powder.

7. The method of manufacturing a molded article according to claim 1, wherein the molding article is a device to be mounted on a vehicle.

8. The method of manufacturing a molded article according to claim 3, wherein the molding die is a case for housing the component.

9. The method of manufacturing a molded article according to claim 3, wherein the component is a reactor coil.

10. The method of manufacturing a molded article according to claim 9, wherein the solid powder is magnetic powder.

11. The method of manufacturing a molded article according to claim 3, wherein the molding article is a device to be mounted on a vehicle.

* * * * *